United States Patent [19]

Hoeschele

[11] 4,069,208

[45] Jan. 17, 1978

[54] HEAT-ACTIVATABLE POLYURETHANE POWDER COATINGS

[75] Inventor: Guenther Kurt Hoeschele, Wilmington, Del.

[73] Assignee: E. I. Du Pont de Nemours and Company, Wilmington, Del.

[21] Appl. No.: 622,431

[22] Filed: Oct. 14, 1975

[51] Int. Cl.$^2$ .................. C08G 18/12; C08L 75/00; C08J 3/12
[52] U.S. Cl. .................. 260/75 NH; 260/29.2 TN; 260/77.5 AM; 260/830 P; 260/858.75 NE; 260/77.5 AA
[58] Field of Search .................. 260/75 NH, 77.5 AM, 260/29.2 TN, 858, 830 P, 75 NE, 77.5 AA

[56] References Cited

U.S. PATENT DOCUMENTS

| 2,830,038 | 4/1958 | Pattison | 260/77.5 |
|---|---|---|---|
| 3,236,812 | 2/1966 | McElroy | 260/75 |
| 3,655,627 | 4/1972 | Hutzler et al. | 260/77.5 AA |
| 3,787,525 | 1/1974 | McGarr | 260/859 R |
| 3,850,880 | 11/1974 | Hakansen et al. | 260/75 NE |

Primary Examiner—H.S. Cockeram

[57] ABSTRACT

A heat-activatable polyurethane powder composition is prepared which contains both epoxy and amino end groups, the distribution of which is determined by the order in which the reactants are brought together. When the powder is deposited on a substrate and heated above its melting point, the epoxy groups react with the active hydrogens available from the amino groups, resulting in the formation of a high molecular weight polyurethane film.

25 Claims, No Drawings

HEAT-ACTIVATABLE POLYURETHANE POWDER COATINGS

BACKGROUND OF THE INVENTION

It is known to prepare thermoplastic polyurethanes directly in the form of powders by reacting polyether or polyester glycols and low molecular weight diols with diisocyanates in an inert solvent in which one of the reactants is immiscible and is emulsified by a surface-active agent. These powders are useful as powder coatings and fabric adhesives, for example, and avoid the problems associated with solvents, but have the disadvantage that their processing temperatures are close to the temperature at which urethanes degrade. Having already attained their ultimate molecular weight, which must be relatively high to provide good physical properties, these thermoplastic polyurethanes have high melt viscosities at the maximum temperatures at which they can be processed. In many instances this high melt viscosity prevents adequate flow during fusion of the powder. Thus a need exists for a powdered polyurethane which exhibits lower melt viscosities at temperatures sufficiently below the point of polymer degradation to permit less critical control of time/temperature cycles during fusion and still provide good physical properties.

SUMMARY OF THE INVENTION

This invention is directed to a heat-activatable polyurethane powder composition containing 0.2 to 1.1 terminal amino groups per terminal epoxy group which is the reaction product of a. one mole of a polymeric glycol having a number average molecular weight of about 400–4,000, b. X moles of a diol having a molecular weight less than about 250 wherein $X = 0-20$, c. Y moles of an organic diisocyanate wherein $Y = 1.03 (1 + X)$ to $1.60 (1 + X)$, d. Z moles of a monohydroxy-epoxide wherein $Z = 0.0286 (1 + X)$ to $1.000 (1 + X)$, and e. $0.7 (2Y - 2X - Z - 2)$ to $1.0 (2Y - 2X - Z - 2)$ moles of a short chain diamine.

This reaction product is further characterized in that it is obtained directly as a powder having a number average particle size of about 200 microns or less, from an inert organic solvent in which at least one of the reactants of the group (a) and (b) is immiscible and is emulsified in said solvent by means of a surface active agent. The amounts of reactants (d) and (e) are selected so that the polyurethane powder contains sufficient amounts of epoxy groups and amino groups such that a substantial increase in molecular weight takes place during heat-activation.

The heat-activatable polyurethane powders of this invention exhibit the same high level of physical properties as do thermoplastic polyurethanes, but are superior in their melt flow characteristics during application.

Physically, the compositions of this invention are finely-divided powders consisting of bead-shaped particles; chemically, they are polyurethanes of limited molecular weight which contain terminal epoxy groups and amino groups in amounts such that a substantial increase in molecular weight occurs upon heating. The amounts of reactants are specified so that this will result. When heated above the fusion point the terminal epoxy groups react with the active hydrogens available, at least some of which are provided by terminal amino groups. This results in the formation of a high molecular weight polyurethane which cannot be readily remelted without risking degradation. The control of melt viscosity at fusion temperatures is accomplished in the present invention by controlling the molecular weight of the heat-activatable intermediates, which in turn is controlled by the proportions of the reactants used.

In the polyurethane powders of this invention the distribution within individual powder particles of terminal epoxy groups and/or amino groups can be varied widely as long as the powder compositions taken as a whole contain a sufficient number of reactive end groups to yield substantial increases in molecular weight when fused. These differences in the distribution of reactive groups are effected by the order in which the reactants are brought together as will be discussed in more detail hereinafter. In one embodiment the powder consists of two kinds of particles, one kind containing only terminal epoxy groups; the other, terminal amino groups. In another embodiment the powder consists of only one type of particle each of which contains suitable amounts of both of the aforesaid terminal groups.

The polymeric glycols used in this invention have number average molecular weights of about 400–4000. Glycols having molecular weights of about 600–2000 are preferred. Useful polymeric glycols include the $C_2$–$C_8$ poly(alkylene oxide) glycols such as poly(ethylene oxide) glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, and poly(1,2-butylene oxide) glycol; also random or block copolymers of ethylene oxide and 1,2-propylene oxide, and polyformals prepared by reacting formaldehyde with diols as 1,4-butanediol or mixtures of diols such as a mixture of ethylene glycol and 1,4-butanediol.

In lieu of poly(alkylene oxide) glycols one may use polythioether glycols which can be considered as derivatives of poly(alkylene oxide) glycols in which some or all of the ether oxygens are replaced by sulfur atoms. Also useful are poly(alkylene-arylene oxide) glycols in which some of the alkylene oxide units of the poly(alkylene oxide) glycols are replaced by arylene oxide units.

Polyester glycols derived by esterification of one or more dicarboxylic acids such as succinic acid, adipic acid, suberic acid, phthalic acid and terephthalic acid with one or more diols such as ethylene glycol, 1,2-and 1,3-propylene glycol, 1,4-butanediol, neopentyl glycol, 1,6-hexanediol and diethylene glycol are particularly useful polymeric glycols. Common representatives of these polyester glycols include poly(ethylene adipate), poly(ethylene/1,2-propylene adipate) and poly(1,4-butylene adipate). Polyester glycols derived from lactones and hydroxyacids are also useful as polymeric glycol. A particularly useful glycol of this class is poly(ε-caprolactone) glycol.

Long chain hydrocarbon glycols such as polybutadiene or polyisoprene glycols, copolymers of these, and saturated glycols are also useful.

Preferred polymeric glycols are (1) the poly(alkylene oxide) glycols, of which poly(tetramethylene oxide) glycol is especially preferred, and (2) polyester glycols, of which poly(butylene adipate) glycol and poly(ε-caprolactone) glycol are especially preferred.

Included among the low molecular weight (less than about 250) diols which can be used in preparing the instant composition are acyclic and alicyclic dihydroxy compounds. Representatives of these are diols with 2-15 carbon atoms such as ethylene, propylene, isobutylene, tetramethylene, pentamethylene, 2,2-dimethyltrimethylene, hexamethylene and decamethylene glycols, diethylene glycol, dihydroxy cyclohexane, and cyclohexane dimethanol. Aliphatic diols containing 2-8 carbon atoms are preferred, and 1,4-butanediol, ethylene glycol, neopentyl glycol, 1,6-hexanediol and diethylene glycol are especially preferred.

Aromatic aliphatic, and cycloaliphatic diisocyanates can be used to prepare the compositions of the present invention, particularly the $C_8$–$C_{25}$ aromatics, $C_2$–$C_{18}$ aliphatics, and $C_5$–$C_{25}$ cycloaliphatics. Representative aromatic diisocyanates are 2,4-tolylene diisocyanate, 2,6-tolylene diisocyanate, 4,4'-methylenebis(phenyl isocyanate), 1,3-phenylene diisocyanate, 1,5-naphthalene diisocyanate and mixtures thereof. Representative aliphatic diisocyanates are hexamethylene diisocyanate, xylylene diisocyanate, 1,12-dodecane diisocyanate and lysine ethyl ester diisocyanate. Representative cycloaliphatic diisocyanates are 4,4'-methylenebis(cyclohexyl isocyanate), 1,4-cyclohexylene diisocyanate, 1-methyl-2,4-cyclohexylenediisocyanate and isophorone diisocyanate. Preferred diisocyanates are 2,4-tolylene diisocyanate, which can contain up to about 50% by weight 2,6-tolylene diisocyanate, 4,4'-methylenebis(phenyl isocyanate), and 4,4'-methylenebis(cyclohexyl isocyanate). Aliphatic and cycloaliphatic diisocyanates are preferred when nondiscoloring compositions are required.

The diamines employed to cap residual —NCO groups are preferably short chain diamines, whose function is to provide the heat-activatable compositions with terminal amino groups. Primary and secondary aliphatic, cycloaliphatic or aromatic diamines are useful in the present invention and include compounds such as ethylene diamine, hexamethylene diamine, piperazine, 1,3- or 1,4-diaminocyclohexane, 4,4'-methylenebis(cyclohexyl amine), 1-methyl-2,4-diaminocyclohexane, 2,4- and 2,6-tolylenediamine, 1,3- and 1,4-phenylene diamine, methylene dianiline, 1,5-naphthalene diamine, N,N'-dimethylethylene diamine and 4,4'-methylenebis(N-methylaniline). Aliphatic and cycloaliphatic amines are employed when nondiscoloring products are required. Preferred diamines include ethylene diamine, hexamethylene diamine, 4,4'-methylenebis(cyclohexyl amine) and 1,3-phenylene diamine.

The use of hydroxy-epoxides for capping free —NCO groups to yield terminal epoxide groups in polyurethanes is known in urethane chemistry. The hydroxy-epoxides which can be used in the present invention preferably contain one hydroxy group and one epoxy group in the molecule. Glycidol is the best known of such compounds and is especially preferred. Other representative compounds include 2,3-epoxybutanol-1, 3-phenyl-2,3-epoxy-propanol-1, 4-oxyethylstyrene oxide, 4(β-hydroxyethoxy)phenyl glycidyl ether and β-hydroxyethyl glycidyl ether. In addition to glycidol another preferred hydroxy epoxide compound is hydroxy-1a,1b,5,5a,6,6a-hexahydro-2,5-methano-2H-oxireno[a]indene, commercially available as "Bakelite" Polycyclol 1222, Union Carbide, N.Y., N.Y.

The ratio of polymeric glycol to low molecular weight diol (if any is employed) for a given set of materials affects the hardness and related physical properties of the final product after heat-activation. The greater the molar ratio of low molecular weight diol to polymeric glycol, the harder the resulting product for a given set of reactants. Up to 20 moles of low molecular weight diol can be used per mole of polymeric glycol.

The molar ratio of diisocyanate to the sum of the moles of polymeric glycol and low molecular weight diol also affects ultimate physical properties and more importantly determines the molecular weight of the intermediate heat-activatable polymers. If the excess of diisocyanate is too low, the molecular weight of the intermediate polymers will be too high for proper melt flow to occur during the fusion step. Such products have substantially the same disadvantages as the prior art polyurethane powders which achieve their maximum molecular weight prior to fusion. On the other hand, if the excess of diisocyanate is too high, very low molecular weight products result. These are often difficult to prepare in powder form by the present process. In addition, they are less stable in storage and may actually be too fluid initially when heat-activated.

It has been found that at least 1.03 and not more than 1.60 moles of diisocyanate should be employed per mole of the total of moles of polymeric glycol and low molecular weight diol. This is true for amine-capped and/or epoxy-capped intermediate polymers. A preferred range is 1.07 to 1.40 moles of diisocyanate per total moles of dihydroxy compounds. This range yields compositions readily prepared in particulate form which additionally have good flow properties during processing.

The ratio of amino groups to epoxy groups contained in the compositions of this invention should be between 1.1/1.0 to 0.2/1.0. In other words, compositions ranging from those having a 10% excess of amino groups all the way to those in which five epoxy groups are present for each amino group are useful. If greater than about a 10% excess of amino groups is employed, the ultimate polymer which can be formed by heat-activation will not have a molecular weight sufficient to provide good physical properties. If less than about 1 amino group is present for 5 epoxy groups, the rate of cure will be too low for most coating applications. The preferred ratio of amino groups to epoxy groups is between 0.9/1.0 to 0.25/1.0.

Generally, up to about 1.0 mole of diamine is used per equivalent of excess isocyanate remaining after the reaction with the hydroxy groups containing reactants. When less than 1.0 mole of the diamine is used, a portion of it is consumed by chain-extension as well as by end-group capping. If more than 1.0 mole of diamine is used, the product can contain some free diamine. Because it is impossible to avoid some chain-extension during capping, it is preferred to use 0.70 to 0.95 mole of diamine per equivalent of excess isocyanato groups. By limiting the amount of diamine used, the presence of free diamine in the product particles is minimized.

Higher functionality can be introduced by replacing part of the diisocyanate, polymeric glycol, low molecular weight diol and diamine with up to 10 mole percent, based on the total diisocyanate used, of a chemically equivalent amount of reactants having a functionality greater than two. Likewise the monohydroxy epoxyde can be replaced in part by compounds having more than one hydroxy and/or epoxy groups. The products resulting from these modifications are more highly crosslinked than those resulting from the normally preferred materials.

The initial process steps which are used to produce the heat-activatable polyurethane powders of this invention involve emulsifying one or more of the reactants (usually a mixture of the glycol and diol) with the aid of a surfactant in an inert solvent in which at least one of said reactants is immiscible and adding a second reactant (usually the diisocyanate) which is miscible with or relatively soluble in the inert solvent. Finally, a hydroxyepoxide and/or a diamine is reacted with the excess isocyanate still present under mild conditions. The product so produced is obtained directly as a fine powder, the particle size of which is largely determined by the size of the droplets present in the initial emulsion.

Organic liquids for use as the continuous phase of the emulsion can be any liquid not reactive with the reactants, e.g., not reactive with —NCO, epoxides or amines, and in which at least one of the reactants and the reaction product are immiscible and insoluble.

It is ordinarily desired that such liquids be sufficiently volatile for removal from the reaction product by evaporation at temperatures which will not harm the product and that the boiling point be above the desired reaction temperature. Liquids with lower boiling points can be used but may require the use of pressure vessels to allow operation at the desired temperature. Liquids which are high boiling or otherwise difficult to separate from the reaction product can be removed by washing or by solvent extraction with liquids which do not harm the reaction product and which are more readily removed. Organic liquids having a boiling point or boiling range, preferably between about 65° C. and about 200° C. such as hydrocarbons and halogenated hydrocarbons can be used. Hydrocarbon liquids, preferably aliphatic hydrocarbon liquids, such as petroleum fractions, have been found desirable because of their low cost, inertness to the reactants and ease and completeness of removal from the reaction product. Preferred solvents for the present invention are $C_6$–$C_{10}$ saturated aliphatic hydrocarbons or mixtures thereof.

The surfactants employed in the present process are preferably nonionic polymeric materials having number average molecular weights in excess of 1000 characterized in that they contain nonpolar moieties such as hydrocarbon radicals and highly polar moities such as amide, ester or carbonyl groups.

A preferred class of such surfactants are the products of simultaneous polymerization and alkylation with α-olefins of heterocyclic N-vinyl monomers. These can be prepared by treating (a) one mole of such monomer alone, or one mole of a mixture of two such monomers, or one mole of a mixture containing such monomer and a nonheterocyclic polymerizable, monoethylenically unsaturated monomer, with (b) 0.05 to 12 moles of an α-olefin, in a solution of an organic solvent common to the monomer or monomers and the α-olefin, at a temperature ranging from 80° to 200° C. for 3 to 60 hours. The resulting solution of alkylated polymer is employed as such or, if desired, the organic solvent is removed by vacuum distillation.

Especially preferred surfactants are the products of copolymerizing N-vinyl-2-pyrrolidone with an α-olefin having 4 to 20 carbon atoms to give copolymers having alkyl side chains of from 2 to 18 carbon atoms, the proportion of alkylated olefin being in the range of from about 10% by weight to about 80% by weight, with number average molecular weight of at least 1000 and preferably above 4000, having been found to be particularly effective surfactants. The quantity of surfactant used will depend on a variety of factors including the physical properties of the reactants and of the inert liquid medium, the time required for the reaction, the efficiency of the emulsifying equipment, the size of reaction product particle desired, and so on. In general, from about 0.5% to about 10% of surfactant based on the total weight of the reactants will be used.

The useful surfactants are by no means limited to the specific ones just described. An emulsion of fine droplets of an insoluble liquid reactant for the production of finely divided polyurethane particles can be prepared using a polymeric surfactant one part of which is solvated by the inert liquid reaction medium and the other part of which is associated with the reactant droplets. For example, in order to emulsify 1,4-butanediol in heptane, one might choose as surfactant a copolymer made from two types of monomer, (a) one like vinyl pyrrolidone, N,N-dimethyl acrylamide, etc., which, if homopolymerized, would be highly compatible with 1,4-butanediol and (b) one like vinyl stearate, lauryl methacrylate, a long chain α-olefin, etc., which, if homopolymerized, would be highly compatible with heptane. Furthermore, the molecular weight of the copolymer and the mole ratio of its monomeric constituents would be such that it would be somewhat more solvated by the heptane than by the 1,4-butanediol so that the heptane would be the external phase.

The quantity of surfactant used is from about 0.5 to 10% by weight based on the total weight of reactants employed. Generally, the surfactant will be used in amounts of 3–7% by weight based on the total weight of the reactants.

Not only is the molar ratio of polar to nonpolar monomers important in surfactants, but also the distribution of monomers in the copolymer, that is, whether the copolymer has a linear, graft or block structure. If the polar monomer contains a group such as nitrile, tertiary amine, lactam, etc., which can form strong dipole interactions with polar groups in the reactants or reaction product, a linear copolymer structure will often be adequate. However, if the polar monomer contains groups such as esters which will form only weak interactions with ester or ether groups in the reactants, then a graft or block structure is usually necessary so that with a multiplicity of such weak bonds, an adequate association can be brought about between the surfactant and the internal phase of the reaction mixture. Homopolymers composed of monomers having both polar and nonpolar moieties can also be used. N-vinyl-3-octyadecyl pyrrolidone, N-vinyl-5-dodecyl-3-morpholinone, 1-hexadecylacrylonitrile, and N,N-dioctylaminoethyl methacrylate are examples of such monomers.

As previously indicated, the present invention contemplates heat-activatable polyurethane powder compositions ranging from those in which each particle contains both epoxy group and amino groups in suitable amounts to provide a cure to those compositions in which two types of particles (one containing epoxy groups, the other amino groups) in suitable proportions are present. Systems which lie between these extremes are obviously possible but in general offer no advantage. The two extremes, called one- and two-part systems for convenience, in general provide equivalent products when heat-activated. Both the one- and two-part systems are stable during storage at room temperature over extended periods of time.

Preparation of compositions representative of the one-part system preferably is accomplished by emulsifying the polymeric glycol, the low molecular weight diol if any is used, and the hydroxy-epoxide with the aid of a surfactant in the inert organic liquid. In order to produce an emulsion, it is understood that the mixture of glycol, diol and epoxide must be liquid under the conditions used. The required excess of diisocyanate is added and reaction is allowed to proceed substantially to completion. The reaction rate can be controlled by adjusting the temperature and/or by using urethane-forming catalysts. Optionally, the epoxide can be added separately following reaction of the diisocyanate with the glycol and diol. Finally, the reaction mixture is added to the diamine, or less preferably, vice versa, and allowed to react. Powedered product is isolated from the resulting dispersion by conventional means such as decantation, filtration or centrifugation. It is normally washed with the same solvent used during the reactions to remove residual surfactant and catalyst if present. The product is then dried at temperatures well below those required for heat-activation. In most cases this means drying at temperatures of less than 120° C. and preferably below 80° C.

Preparation of two-part systems involves carrying out the reaction between polymeric glycol (optionally in conjunction with diols) and diisocyanate as described for the one-part system. The resulting reaction product containing free —NCO groups is reacted with an equivalent amount of hydroxy-epoxide or two equivalents of polyamine to provide powders containing either group. In a preferred embodiment, the component containing the epoxy-terminated groups is prepared by adding the diisocyanate to an emulsion containing the epoxide as well as the glycol and diol. A two-part system results when suitable amounts of the two types of powders are mixed uniformly. Obviously, the initial —NCO-terminated urethane used to prepare one part can differ from the initial —NCO-terminated urethane used for the preparation of the second part if desired.

It has been found useful with some products to incorporate a finely-divided solid material such as talc, fumed silica or a pigment to improve the flow properties of the powdered product. Such additives generally improve filtration during product isolation and therefore are preferably added at any stage prior to filtration including addition along with the starting materials. They can of course be added to the dry powder. Other additives such as antioxidants, UV-absorbers, other stabilizers, flow promoters, etc., can be incorporated by the same techniques.

Bead-shaped particles having number average sizes of about 200 microns to as low as about 10 microns can be produced by the procedures described hereinbefore. Particle size is largely controlled by the nature and amount of surfactant, intensity of agitation and of temperature employed during the reaction. For a given system and set of equipment, particle size is reduced when the amount of surfactant is increased and vice versa. Particles in this size range are well suited for a variety of powder-coating techniques such as fluidized bed, electrostatic spray, powder flow coating, and heat-fused coatings for flexible substrates. The powders are also useful as hot-melt adhesives. Typically the powder is applied to the desired surface in pigmented form and heated to its activating temperature, causing the epoxy-terminated ends of the polyurethane to react with the amino-terminated ends of an adjacent molecule to form a high molecular weight polymer.

The powders of this invention can be activated at temperatures ranging from 110° C. to 230° C. The preferred temperature for a given system in a given application largely depends on the melting point of the powder, the structure of the epoxy groups, the reactivity of the amino groups and the nature of the substrate. In most commercial applications temperatures of 140° to 210° C. will be satisfactory. The preferred compositions of this invention yield rapid cures at 170° to 200° C. without significant decomposition. The temperatures stated refer to the actual temperature of the melt. Much higher temperatures may be required in air or other media in contact with the polymer to raise its temperature rapidly.

The fusion conditions also depend on the melt flow properties of the particular powder to a large extent. As previously indicated, prior art polyurethane powders have high melt viscosities even at temperatures approaching their decomposition points. In contrast, the powders of the present invention offer a combination of low melt viscosity at safe processing temperature and a high level of physical properties by virtue of their high molecular weights after curing. The instant powders exhibit initial melt viscosities generally 5–10 times lower than prior art polyurethanes having similar ultimate physical properties. It is obvious that the lower melt viscosity results in superior film formation and improved penetration of porous substrates.

EXAMPLES

The following ASTM methods were employed in determining the properties of the polymers prepared in the Examples which follow. The cured polyurethane compositions are kept at room temperature and 50% relative humidity for one week prior to testing.

| | |
|---|---|
| Modulus at 100% elongation, $M_{100}$ | D412* |
| Modulus at 200% elongation, $M_{200}$ | D412* |
| Modulus at 300% elongation, $M_{300}$ | D412* |
| Tensile at Break, $T_B$ | D412* |
| Elongation at Break, $E_B$ | D412* |
| Split Tear | D470** |
| Melt Index | D1238*** |

Particle Size of the powders prepared in the following examples was determined by a Coulter Counter.
Melting Points reported were determined in capillaries using an electrothermally heated melting point apparatus.
Surfactant A was a copolymer of 20 parts by weight N-vinyl-2-pyrrolidone and 80 parts by weight α-eicosene, average molecular weight about 8600.
Surfactant B was a copolymer of 20 parts by weight N-vinyl-2-pyrrolidone and 80 parts by weight α-hexadecene, average molecular weight about 7300.
Surfactant C was a copolymer of 50 parts by weight N-vinyl-2-pyrrolidone and 50 parts by weight α-hexadecene, average molecular weight 9500.

The units of measurement employed in the Examples are those of the International System of Units. In this system, 1000 psi = 6.894 MPa and 100 pli = 17.513 kN/m.

EXAMPLE 1

In this example the preparation of a two-part heat-activated powder composition is described.

Composition A (Polyurethane powder containing epoxy end groups)

To a solution of 19.0 g Surfactant A in 1100 ml n-heptane, 196 g polytetramethylene ether glycol (number average molecular weight 980, 0.2 mole) 54 g 1,4-butanediol (0.6 mole) and 30 g freshly distilled glycidol (0.405 mole) are added and emulsified by vigorous agitation at 70° C. After addition of 10 ml of a 5% solution of dibutyltin dilaurate in heptane, 262 g 4,4'-methylenebis(cyclohexyl isocyanate) containing about 20% trans, trans isomer (1.0 mole) is charged to the reaction mixture over a period of about 12 minutes. During the isocyanate addition external cooling is applied to maintain the reaction temperature at 80° C. After heating for 2 hours at 80° C. the reaction is complete and the slurry of finely divided particles is allowed to settle out by standing at room temperature for 10 minutes. The reaction product is isolated by filtration, washed with 1000 ml n-heptane and finally dried at 60° C.

The polyurethane powder is screened through a 100 mesh screen and is characterized as follows:
   Average particle size, μ — 32
   Melt index at 190° C., g/10 min. — ca 8000
   Melting range, ° C. — 153-158
   Epoxy content, % — 2.5

Composition B (Polyurethane powder containing aliphatic amino end groups)

The general procedure given for the preparation of Composition A is essentially repeated except that the following starting materials are used:
   1100 ml n-heptane
   27 g Surfactant A
   196 g polytetramethylene ether glycol (0.2 mole)
   63 g 1,4-butanediol (0.7 mole)
   262 g 4,4'-methylenebis(cyclohexyl isocyanate) (20% trans, trans isomer, 1.0 mole)
   10 ml 5% catalyst solution (as above)

After addition of the diisocyanate the resulting slurry of finely divided solids is heated for 1 hour at 80° C. After cooling to 50° C. the free isocyanate groups of the polyurethane are then capped with 1,6-hexamethylene diamine by passing the slurry into a dispersion of 23.5 g 1,6-hexamethylene diamine (0.206 mole) in 300 ml heptane in the presence of 1.5 g Surfactant A with vigorous agitation at 50° C. After stirring for 30 minutes the reaction mixture is worked up as described above for Composition A.

The fine powder was screened through a 150 mesh screen and was characterized as follows:
   Average particle size, μ — 35
   Melt index at 190° C., g/10 min. — 86.3
   Melting range, ° C. — 148-152
   Amino nitrogen content, % — 0.36

Heat-activatable polyurethane compositions are prepared by dry-blending Composition A with Composition B in the proportions shown in Table I. To demonstrate the lower melt viscosities of the instant powder compositions relative to the prior art the flow characteristics were determined as a function of time. For comparison, a prior art polyurethane powder, containing polytetramethylene ether glycol, butanediol-1,4 and 4,4'-methylenebis(cyclohexyl isocyanate) in the molar ratio of 1.0:5.0:6.0 respectively, was included in this study. In each case seven grams of powder was quickly charged to the melt indexer which was preheated to 190° C. After a residence time of two minutes the melt index was determined at one minute intervals. Although the melt temperature during the melt index determination after a residence time of only two and three minutes has not yet reached 190° C. these conditions resemble closely the situation during the fusion of the polyurethane powder. Since the melt index is inversely proportional to the melt viscosity it is quite evident that the instant powder compositions exhibit greatly superior flow characteristics compared to prior art compositions and in addition maintain the high level of physical properties observed with thermoplastic polyurethanes.

TABLE I

| | Flow Characteristics and Physical Properties of Polyurethane Powder Compositions | | | | |
|---|---|---|---|---|---|
| | #1 | #2 | #3 | #4 | For Comparison |
| Ratio of NH$_2$/Epoxy | 0.75/1 | 0.5/1 | 0.375/1 | 0.25/1 | Prior Art thermoplastic polyurethane powder |
| Pts. Composition B/100 pts. Composition A | 170 | 113 | 85 | 57 | |
| Flow Characteristics at 190° C. | | | | | |
| M.I. 190° C  2 min. | 33 | 65 | 118 | 198 | 6.1 |
| 3 min. | 3.1 | 6.9 | 20.5 | — | 10.0 |
| 4 min. | 0.26 | 0.9 | 7.5 | 53 | 13.7 |
| 5 min. | 0.1 | 0.15 | 3.0 | 54 | 13.9 |
| Physical properties of 0.76 mm (30 mil) slabs, compression molded at 190° C. for 5 min. | | | | | |
| $T_B$, MPa | 47.3 | 37.6 | 22.9 | 23.6 | 46.9 |
| $E_B$, % | 310 | 300 | 220 | 280 | 310 |
| $M_{100}$, MPa | 16.1 | 15.6 | 15.0 | 14.0 | 17.7 |
| $M_{200}$, MPa | 26.5 | 23.8 | 21.7 | 18.3 | 28.6 |
| $M_{300}$, MPa | 43.8 | 37.6 | — | — | 44.1 |
| Split Tear, kN/m | 74.4 | 84.1 | 84.1 | 94.6 | 101.6 |

Similar properties were obtained on a 0.13 mm (5 mil) film prepared by spraying the powder electrostatically onto release paper and fusing in a 200° C. oven for 3 minutes.

EXAMPLE 2

In this example, the preparation of a one-part heat-activatable powder composition based on the same principles as the two-part polyurethane system disclosed in Example 1 is described.

The general procedure used for the preparation of the polyurethane powder compositions of Example 1 is essentially repeated except that the following starting materials are used:
   550 ml n-heptane
   20.5 g Surfactant A
   97.5 g polytetramethylene ether glycol (0.1 mole)
   22.5 g 1,4-butanediol (0.25 mole)
   4.95 g glycidol (0.066 mole)
   104.7 g 4,4'-methylenebis(cyclohexyl isocyahate) (20% trans, trans isomer, 0.4 mole)

10 ml 5% catalyst solution (as described in Example 1).

The diisocyanate is added last at 80° C.-85° C. to the dispersion of above starting materials over a period of about 5 minutes with vigorous agitation. After heating for 1 hour at 85° C., the reaction temperature is reduced to 50° C. and the slurry is poured into a dispersion of 3.85 g 1,6-hexamethylene diamine (0.033 mole) in a mixture of 150 ml n-heptane and 1.0 g Surfactant A vigorously agitated at 50° C. After agitating for one hour while the temperature is allowed to drop to room temperature, the reaction mixture is worked up according to the procedure given in Example 1.

The dried powder is screened through a 100 mesh screen and characterized as follows:

Average particle size, $\mu$ — 30
Melting range, ° C. — 222-230

A 0.64 mm (25 mil) film prepared by compression molding at 235° C. for 1.5 minutes had the following properties:

$M_{100}$, MPa — 13.8
$M_{200}$, MPa — 17.9
$M_{300}$, MPa — 23.4
$T_B$, MPa — 25.9
$E_B$, % — 340
Split tear, kN/m — 73.6

The one-part polyurethane powder composition is storage stable at room temperature for several months.

EXAMPLE 3

The procedure of Example 2 is essentially repeated except that the following starting materials are used:

550 ml n-heptane
20.5 g Surfactant A
4.95 g glycidol (0.066 mole)
114.5 g poly(butylene adipate) glycol having a number average molecular weight of 1145 (0.1 mole)
22.5 g 1,4-butanediol (0.25 mole)
100 g 4,4'-methylenebis(phenyl isocyanate) (0.4 mole)
5 ml 5% catalyst solution of Example 1

The capping reaction is carried out with m-phenylene diamine by pouring the reaction mixture resulting from the above starting materials into a dispersion of 3.6 g m-phenylene diamine (0.033 mole) in 100 ml n-heptane in the presence of 1.0 g Surfactant A at 65° C.

The dried polyurethane powder melts at about 235° C. The physical properties of a 0.64 mm (25 mil) film prepared by compression molding for 3 minutes at 240°-245° C. are given below:

$M_{100}$, MPa — 12.8
$M_{200}$, MPa — 15.7
$M_{300}$, MPa — 21.0
$T_B$, MPa — 23.0
$E_B$, % — 340
Split tear, kN/m — 104.2

After storage of the polyurethane powder for seven months at room temperature, 0.64 mm (25 mil) film is prepared by compression molding as above and tests as shown below:

$M_{100}$, MPa — 12.8
$M_{200}$, Mpa — 15.5
$M_{300}$, MPa — 20.3
$T_B$, MPa — 26.9
$E_B$, % — 390
Split tear, kN/m — 66.5

The powder composition is readily processable under these conditions indicating that storage does not adversely affect its usefulness.

EXAMPLE 4

The procedure given in Example 1 is essentially repeated with the following starting materials:

Composition A 600 ml n-heptane
4.2 g Surfactant B
9.8 g Surfactant C
114.5 g poly(butylene adipate) glycol (0.1 mole)
27.0 g 1,4-butanediol (0.3 mole)
14.8 g glycidol (0.2 mole)
114.5 g 4,4'-methylenebis(cyclohexyl isocyanate) (20% trans, trans isomer, 0.4 mole)
10 ml 5% catalyst solution of Example 1

Composition B

Same as for Composition A except that 31.5 g 1,4-butanediol (0.35 mole) instead of 27.0 g 1,4-butanediol and 11.6 g 1,6-hexamethylene diamine (0.1 mole) instead of 14.8 g glycidol are used.

After screening through a 150 mesh screen, the resulting powder compositions A and B have the following properties:

| | A | B |
|---|---|---|
| Melt index at 190° C, g/10 min. | 2500 | 96.5 |
| Average particle size, $\mu$ | 36 | 42 |
| Melting range, ° C. | 144-149 | 146-155 |
| Epoxy content, % | 2.4 | — |
| Amino nitrogen, % | — | 0.36 |

A heat-activatable polyurethane composition is prepared by dry-blending 100 parts of Composition A and 108.5 parts of Composition B. A 0.64 mm (25 mil) film obtained from above mixture by compressing molding at 160° C. for 10 minutes has the following properties:

Melt index at 190° C., g/10 min. — No flow
$M_{100}$, MPa — 16.5
$M_{200}$, MPa — 27.2
$M_{300}$, MPa — 46.2
$T_B$, MPa — 46.9
$E_B$, % — 305
Split tear, Kn/m — 138.4

EXAMPLE 5

The procedure of Example 1 for the preparation of Composition A is essentially repeated except that 67.4 g of "Bakelite" Polycyclol 1222* is used instead of 30 g glycidol. The resulting powder composition is characterized as follows:

Melt index at 190° C., g/10 min. — 2500
Melting range, ° C. — 128-138
Epoxy content, % — 2.3

One hundred parts of Composition A is dry blended with 117 parts of Composition B of Example 1. The mixture is used for preparing 0.76 mm (30 mil) film by compression molding at 190° C. for 5 minutes. The resulting polymer has the following properties:

$M_{100}$, MPa — 18.1
$M_{200}$, MPa — 22.1
$T_B$, MPa — 25.2
$E_B$, % — 280
Split tear, kN/m — 73.6
Shore D hardness — 66

* hydroxy-1a, 1b, 5, 5a, 6, 6a-hexahydro-2,5-methano-2H-oxireno[a]indene

EXAMPLE 6

A. The procedure of Example 1 for the preparation of Composition B is essentially repeated except that 21.6 g m-phenylene diamine (0.2 mole) used instead of 23.5 g 1,6-hexamethylene diamine and the reaction temperature for the capping reaction is raised to 60°–65° C.

B. Above procedure is essentially repeated except that 27.2 g xylylene diamine (0.2 mole) is used instead of 21.6 g m-phenylene diamine.

The resulting amine terminated powder compositions are characterized as follows:

|  | Composition 6A | Composition 6B |
| --- | --- | --- |
| Melt index at 190° C., g/10 min. | 51 | 235 |
| Melting range, ° C. | 140–148 | 137–148 |
| Amino nitrogen, % | 0.48 | 0.48 |

Seventy-one parts of each of the amine terminated powder compositions is dry-blended with 100 parts of Composition A of Example 1 and compression molded at 190° C. to form 0.76 mm (30 mil) films. The pertinent physical property data are shown below:

|  | Blend 1A + 6A | Blend 1A + 6B |
| --- | --- | --- |
| Molding conditions | 190° C/15 min. | 190° C/5 min. |
| Melt index at 190° C. after molding, g/10 min. | 11.5 | no flow |
| $M_{100}$, MPa | 14.9 | 19.0 |
| $M_{200}$, MPa | 22.4 | 33.8 |
| $T_B$, MPa | 32.4 | 57.2 |
| $E_B$, % | 290 | 280 |
| Split tear, kN/m | 91.9 | 57.8 |

This application is related to Ser. No. 535,135, filed Dec. 20, 1974.

I claim:

1. In a process for forming a heat-activatable polyurethane powder characterized by low-melt viscosity upon initial melting, and in which powder the particles are generally bead-like in form, the improvement consisting essentially of (1) reacting
   a. one mole of polymeric glycol having a number average molecular weight of about 400–4,000,
   b. X moles of a diol having a molecular weight less than about 250 wherein X = 0—20,
   c. Y moles of an organic diisocyanate wherein Y = 1.03 (1 + X) to 1.60 (1 + X), d. Z moles of a monohydroxy-epoxide wherein Z = 0.0286 (1 + X) to 1.000 (1 + X),
   e. 0.7 (2Y-2-X-Z-2) to 1.0 (2Y-2X-Z-2) moles of a short chain diamine, and (2) selecting the amounts of reactants (d) and (e) so that the polyurethane powder formed will contain 0.2 to 1.1 amino groups per epoxy group, and wherein (3) the size and shape of bead particles is achieved by initially emulsifying reactants (a) and (b) in an inert organic solvent with the aid of a surfactant, followed by converting said emulsion to a dispersion of finely-divided polyurethane beads and recovering the latter.

2. The process of claim 1 wherein said polymeric glycol is selected from the group consisting of a poly(alkylene oxide) glycol and a polyester glycol.

3. The process of claim 2 wherein said polymeric glycol is poly(tetramethylene oxide) glycol.

4. The process of claim 2 wherein said polymeric glycol is poly(ε-caprolactone) glycol.

5. The process of claim 1 wherein said diol is an acyclic or alicyclic diol.

6. The process of claim 5 wherein said diol is an aliphatic diol selected from the group consisting of 1,4-butanediol, ethylene glycol, neopentyl glycol, 1,6-hexanediol and diethylene glycol.

7. The process of claim 1 wherein said diisocyanate is selected from the group consisting of an aromatic, an aliphatic and a cycloaliphatic diisocyanate.

8. The process of claim 7 wherein said diisocyanate is selected from the group consisting of 2,4-tolylene diisocyanate, containing 0% to about 50% 2,6-tolylene diisocyanate, 4,4'-methylenebis(phenylisocyanate), and 4,4'-methylenebis(cyclohexyl isocyanate).

9. The process of claim 1 wherein said monohydroxy-epoxide is glycidol.

10. The process of claim 1 wherein said diamine is selected from the group consisting of ethylene diamine, hexamethylene diamine, 4,4'-methylenebis(cyclohexyl amine) and 1,3-phenylene diamine.

11. The process of claim 1 wherein said inert organic liquid is a $C_6$-$C_{10}$ saturated aliphatic hydrocarbon.

12. The process of claim 1 wherein said surfactant is a nonionic polymer having a molecular weight in excess of 1,000 and containing both nonpolar and highly polar moieties.

13. The process of claim 12 wherein said surfactant is a copolymer of vinyl pyrrolidone with an α-olefin having 4–20 carbon atoms.

14. A process for forming a heat-activatable polyurethane powder which comprises the steps of (1) emulsifying with the aid of a surfactant one mole of a polymeric glycol or a mixture thereof with X moles of a low molecular weight diol wherein X = 0 − 20 in an inert organic liquid, (2) contacting the resulting emulsion with 1.03 (1 + X) to 1.60 (1 + X) moles of an organic diisocyanate, (3) allowing the diisocyanate to react with the polymeric glycol or mixture thereof with a low molecular weight diol in the emulsion to form an —NCO-terminated polyurethane dispersed in said inert liquid, (4) contacting the resulting dispersion with a hydroxy-epoxide, (5) permitting the aforesaid epoxide to react with about 48 to 83% of the free —NCO groups of the dispersed polyurethane to form a polyurethane partially terminated with epoxy groups, (6) contacting the resulting dispersion with 0.7 to 1.0 moles of a diamine per equivalent of —NCO groups remaining after step (5) and then reacting the diamine with —NCO groups of said polyurethane to provide the polyurethane with free amino groups, and (7) separating the dispersed polyurethane as a finely-divided powder, the particles of said powder providing epoxide-terminated urethane groups and terminal amino groups in such amounts that when the powder is heated the epoxy groups will react with said amino groups to substantially increase the molecular weight of said polyurethane.

15. A process for forming a heatactivatable polyurethane powder comprising the steps of (1) emulsifying with the aid of a surfactant one mole of a polymeric glycol, or a mixture thereof with X moles of a low molecular weight diol wherein X = 0 − 20, and 0.0286 (1 + X) to 1.00 (1 + X) moles of a hydroxy-epoxide in an inert organic liquid, (2) contacting the resulting emulsion with 1.03 (1 + X) to 1.60 (1 + X) moles of an organic diisocyanate, (3) allowing the diisocyanate to react with said polymeric glycol or mixture thereof with said diol with said epoxide to form a dispersion of polyurethane in which some of the —NCO groups are still present, (4) contacting the resulting dispersion with 0.7 to 1.0 moles of a diamine per equivalent of –NCO groups remaining after step (3) and then reacting the latter with the residual —NCO groups of said polyurethane to provide the polyurethane with free amino groups, and (5) separating the dispersed polyurethane as a finely-divided powder, the particles of said powder providing epoxy-terminated urethane groups and amino groups in such amounts that when the powder is heated the epoxy groups will react with said free amino groups to substantially increase the molecular weight of said polyurethane.

16. The process of claim 15 in which the surfactant is a copolymer of N-vinyl-2-pyrrolidone and an α-olefin and has a molecular weight above about 4,000 and the inert organic liquid is a saturated aliphatic hydrocarbon.

17. The process of claim 15 in which the inert organic liquid is a saturated aliphatic hydrocarbon and the surfactant is a member of the group consisting of (a) a copolymer of 20 parts by weight N-vinyl-2-pyrrolidone and 80 parts by weight α-eicosene having an average molecular weight of about 8,600, (b) a copolymer of 20 parts by weight N-vinyl-2-pyrrolidone and 80 parts by weight α-hexadecene, average molecular weight about 7,300, and (c) a copolymer of 50 parts by weight N-vinyl-2-pyrrolidone and 50 parts by weight α-hexadecene, average molecular weight about 7,300, and (c) a copolymer of 50 parts by weight N-vinyl-2-pyrrolidone and 50 parts by weight α-hexadecene, average molecular weight about 9,500.

18. A process for making particles of a polyurethane powder having epoxy-terminated urethane groups, which can serve as one component of a heat-activatable polyurethane powder composed of a mixture of two separate types of particles, one type having epoxy-terminated urethane groups, and the second having terminal amino groups, so that said mixture provides suitable amounts of each type, said process comprising forming the first type of particles by the steps of (1) mixing a polymeric polyol, or a mixture thereof with a low molecular weight diol, and a hydroxy-epoxide in an inert organic liquid in which said polymeric glycol or mixture thereof with a low molecular weight diol is insoluble and forming an emulsion thereof with the aid of a surfactant, (2) contacting the resulting emulsion with an organic diisocyanate, (3) allowing the diisocyanate to react with said polyol or a mixture thereof with a low molecular weight diol, and with said epoxide to form a dispersion of polyurethane containing epoxy-terminated urethane groups, and (4) separating the resulting product as a finely-divided powder.

19. A heat-activatable polyurethane powder prepared by the process of claim 1.

20. A heat-activatable polyurethane powder prepared by the process of claim 14.

21. A heat-activatable polyurethane powder prepared by the process of claim 15.

22. A polyurethane powder prepared by the process of claim 18.

23. A process for forming a heat-activatable polyurethane powder composed of a mixture of two separate types of particles, one type having epoxy-terminated urethane groups and the other type having terminal amino groups, comprising A. forming the first type of particles by the steps of (1) emulsifying with the aid of a surfactant one mole of a polymeric glycol or a mixture thereof with X moles of a low molecular weight diol wherein X = 0 − 20 in an inert organic liquid, (2) contacting the emulsion with 1.03 (1 + X) to 1.60 (1 + X) moles of an organic diisocyanate, (3) allowing the diisocyanate to react with said polymeric glycol or mixture thereof with low molecular weight diol in the emulsion to form an -NCO-terminated polyurethane dispersed in said inert organic liquid, (4) contacting the resulting dispersion with 0.06 (1 + X) to 1.20 (1 + X) moles of a hydroxy-epoxide, (5) permitting the latter to react with essentially all of the free –NCO groups of the dispersed polyurethane to form an epoxy-terminated polyurethane, and (6) separating the dispersed polyurethane as a finely-divided powder, B. forming the second type of particles by the steps of (1) emulsifying with the aid of a surfactant one mole of a polymeric glycol or a mixture thereof with X moles of a low molecular weight diol wherein X = 0 − 20 in an inert organic liquid, (2) contacting the emulsion with 1.03 (1 + X) to 1.60 (1 + X) moles of an organic diisocyanate, (3) allowing the diisocyanate to react with said polymeric glycol or mixture thereof with low molecular weight diol in the emulsion to form an —NCO-terminated polyurethane dispersed in said organic liquid, (4) contacting the resulting dispersion with 0.7 to 1.0 moles of a diamine per equivalent of —NCO groups remaining after step (3) to react the latter with the available —NCO groups of the dispersed polyurethane to provide terminal groups, and (5) separating the resulting product as a finely-divided powder; and mixing the two types of particles in such proportions that the ratio of amino groups to epoxy groups is 0.2/1.0 to 1.1/1.0.

24. Process of claim 15 wherein said polymeric glycol is poly(tetramethylene ether) glycol; said low molecular weight diol is 1,4-butanediol; said diisocyanate is 4,4'-methylenebis(cyclohexyl) isocyanate); and said diamine is 1,6-hexamethylenediamine.

25. A heat-activatable polyurethane powder made by the process of claim 23.

* * * * *

UNITED STATES PATENT OFFICE
CERTIFICATE OF CORRECTION

PATENT NO. : 4,069,208
DATED : January 17, 1978
INVENTOR(S) : Guenther Kurt Hoeschele It is certified that error appears in the above-identified patent and that said Letters Patent are hereby corrected as shown below:

In Column 8, line 50, the three footnotes (*, , and *) are missing; they should be inserted at line 50 as follows:

*   Cross-head speed 5.08 cm (2") per minute.

**  Modified by use of 3.81 cm x 7.62 cm (1.5" x 3") sample with 3.81 cm (1.5") cut on the long axis of the sample. This configuration prevents "necking down" at the point of tearing. Cross-head speed 127 cm (50") per minute.

*** 2160 g. load.

In Column 13, line 51, "(2Y-2-X-Z-2)" should be --(2Y-2X-Z-2)--.

Signed and Sealed this

Fourteenth Day of November 1978

[SEAL]

Attest:

RUTH C. MASON
Attesting Officer

DONALD W. BANNER
Commissioner of Patents and Trademarks